United States Patent
Zhou et al.

(10) Patent No.: US 9,944,795 B2
(45) Date of Patent: Apr. 17, 2018

(54) HYDROLYTICALLY STABLE FUNCTIONALIZED POLYPHOSPHONATE FLAME RETARDANT

(71) Applicant: PolyOne Corporation, Avon Lake, OH (US)

(72) Inventors: Chongfu Zhou, Avon, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 14/427,340

(22) PCT Filed: Sep. 11, 2013

(86) PCT No.: PCT/US2013/059217
§ 371 (c)(1),
(2) Date: Mar. 11, 2015

(87) PCT Pub. No.: WO2014/043203
PCT Pub. Date: Mar. 20, 2014

(65) Prior Publication Data
US 2015/0240080 A1    Aug. 27, 2015

Related U.S. Application Data

(60) Provisional application No. 61/699,932, filed on Sep. 12, 2012.

(51) Int. Cl.
| | |
|---|---|
| C08L 85/02 | (2006.01) |
| C09K 21/12 | (2006.01) |
| C09K 21/14 | (2006.01) |
| C08K 5/49 | (2006.01) |
| C08K 5/29 | (2006.01) |
| C08L 33/06 | (2006.01) |
| C08L 43/02 | (2006.01) |

(52) U.S. Cl.
CPC ............. *C08L 85/02* (2013.01); *C08L 33/066* (2013.01); *C08L 33/068* (2013.01); *C08L 43/02* (2013.01);
(Continued)

(58) Field of Classification Search
CPC ....... C08G 79/04; C08L 85/02; C08L 33/068; C09D 185/02; C09D 133/068;
(Continued)

(56) References Cited

U.S. PATENT DOCUMENTS

| | | | |
|---|---|---|---|
| 5,216,113 A | 6/1993 | Schulz-Schlitte et al. | |
| 7,449,526 B2 | 11/2008 | Leychik et al. | |

(Continued)

FOREIGN PATENT DOCUMENTS

| | | | | |
|---|---|---|---|---|
| EP | 2 115 061 B1 | 12/2010 | | |
| EP | 2115061 B1 | * 12/2010 | ............ | C08F 279/02 |

(Continued)

OTHER PUBLICATIONS

Machine translation of JP 2010111735 A.*
(Continued)

*Primary Examiner* — Kregg T Brooks
(74) *Attorney, Agent, or Firm* — Michael J. Sambrook; Maria M. Hoke; John H. Hornickel

(57) ABSTRACT

Functionalized non-halogenated flame retardants are disclosed having improved hydrolytic stability, represented by decreased conductivity measured in units of ? S/cm when immersed in distilled water and heated to 80 C. The functionalized flame retardant comprises polyphosphonate functionalized by epoxy-functional styrene-acrylic oligomer or aromatic carbodiimide, and optionally antioxidant. Also disclosed are polymer compounds, comprising the functionalized flame retardant described above and a second polymer resin; and flame retardant plastic articles made from such polymer compounds.

5 Claims, 2 Drawing Sheets

(52) U.S. Cl.
CPC .............. *C09K 21/12* (2013.01); *C09K 21/14* (2013.01); *C08K 5/29* (2013.01); *C08L 2201/02* (2013.01); *C08L 2205/03* (2013.01)

(58) Field of Classification Search
CPC .......... C09J 185/02; C08K 5/29; C09K 21/12; C09K 21/14; C08J 2385/02
See application file for complete search history.

(56) References Cited

U.S. PATENT DOCUMENTS

| | | |
|---|---|---|
| 7,666,932 B2 | 2/2010 | Freitag et al. |
| 9,062,201 B2 * | 6/2015 | Zhu ........................ C09K 21/14 |
| 2006/0074202 A1 * | 4/2006 | Juikar .................... C08K 5/353 |
| | | 525/439 |
| 2011/0263745 A1 * | 10/2011 | Wanzke ............... C08K 5/0066 |
| | | 521/182 |

FOREIGN PATENT DOCUMENTS

| | | | |
|---|---|---|---|
| JP | 54-078796 A | | 6/1979 |
| JP | 2010111735 A | * | 5/2010 |

OTHER PUBLICATIONS

Scifinder properties of CAS 26023-30-3.*
CIBA Irganox 1076 Data Sheet (2004).*
CIBA Irgafos 168 Data Sheet (2004).*

* cited by examiner

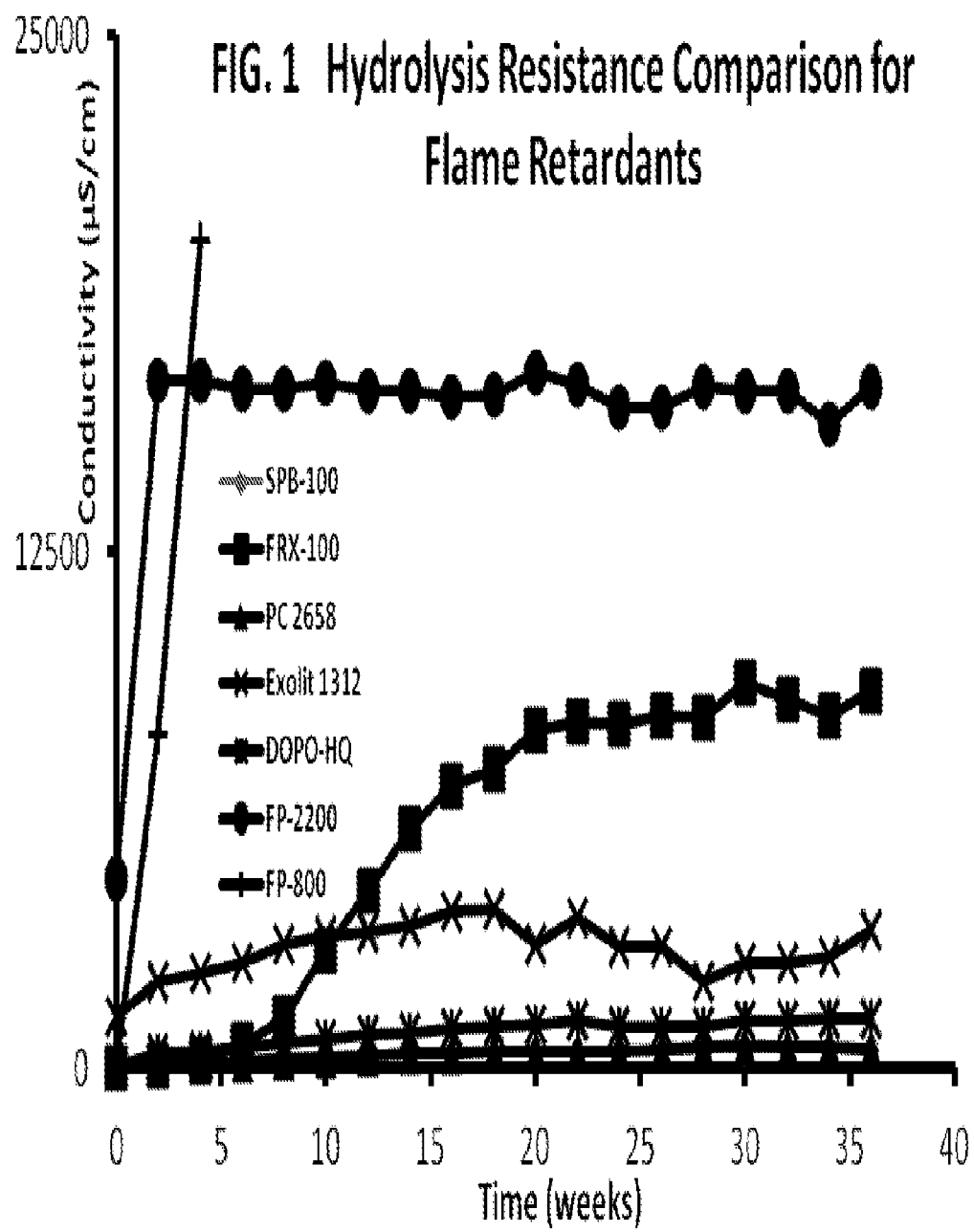

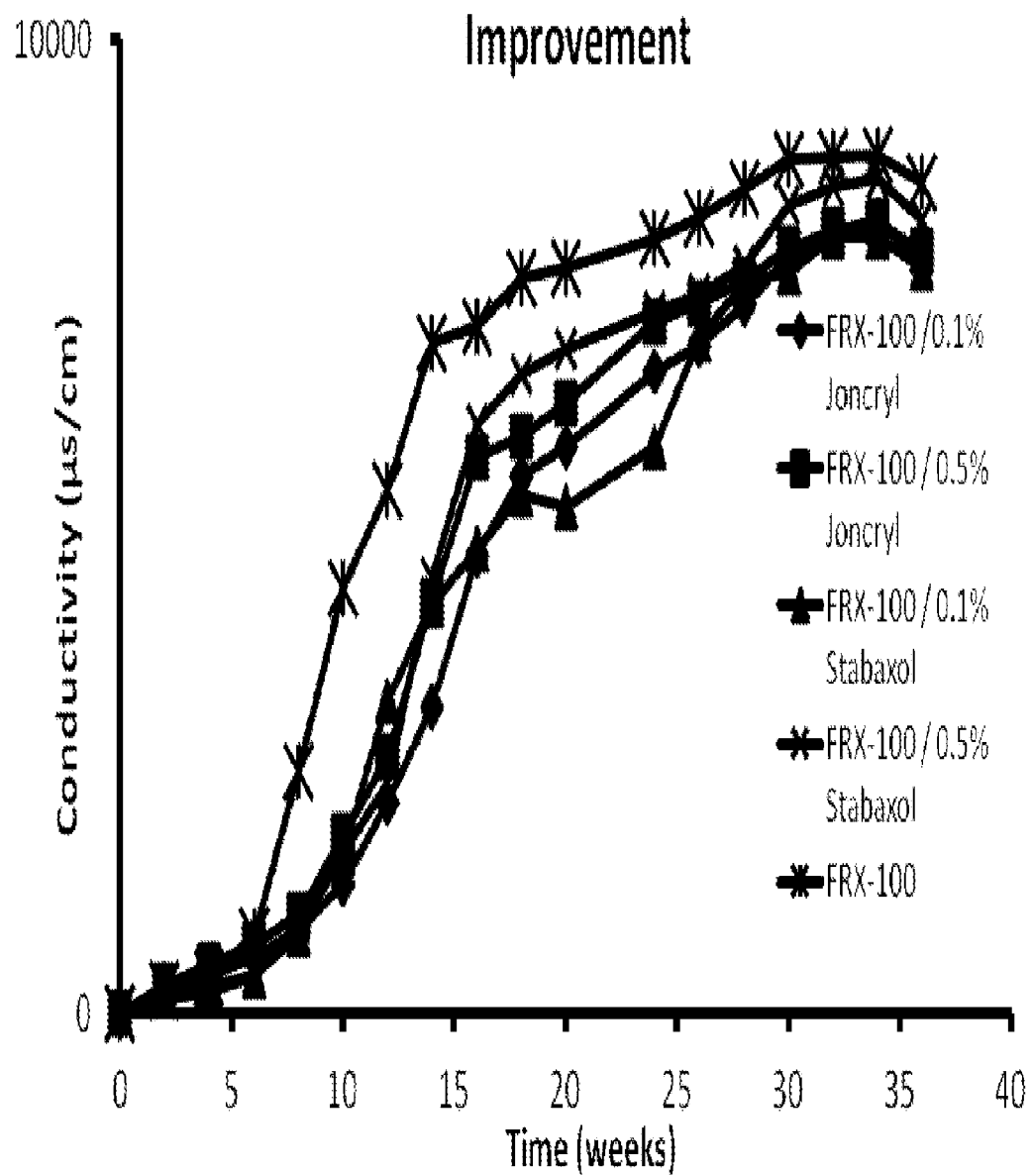

HYDROLYTICALLY STABLE FUNCTIONALIZED POLYPHOSPHONATE FLAME RETARDANT

CLAIM OF PRIORITY

This application claims priority from U.S. Provisional Patent Application Ser. No. 61/699,932 bearing and filed on Sep. 12, 2012, which is incorporated by reference.

FIELD OF THE INVENTION

This invention concerns functionalized polyphosphonate flame retardants having improved hydrolytic stability, represented by decreased conductivity measured in units of μS/cm when immersed in distilled water and heated to 80° C.; polymer compounds containing such polyphosphonate flame retardants; and flame retardant plastic articles made from such polymer compounds.

BACKGROUND OF THE INVENTION

Thermoplastic compounds, unlike wood, metal, or glass, do not rot, rust or shatter. For that reason, the world in the past seventy years has seen a revolution in material science arising from the combination of thermoplastic resin and one or more functional additives to provide specific properties to the resin.

During processing, polymers are heated to reach a molten state for mixing with other ingredients and then forming into the shape of the final article. However, once the final polymeric article is made, the melting and even potential burning of the article when exposed to excessive heat or open flame can be detrimental to property and persons. Some polymers, such as polyvinyl chlorides, are inherently more able to withstanding exposure to heat and/or an open flame without melting or burning. On the other hand several commonly used polymers such as polyolefins, polyesters, and polycarbonates are more vulnerable to melting or burning.

Therefore, the plastic industry has focused on making polymeric materials having improved flame retardancy. Flame retardant additives, drip suppressants, mineral fillers and char formers are used as functional additives to help thermoplastic compounds retard the effects of heat or flame from causing a material to melt or even burn. Many early flame retardants relied on halogen-containing compounds, but more recently several non-halogenated fame retardants have been developed. Non-halogenated flame retardants have become popular, because they minimize the release of halogenated chemicals if the plastic article would begin to degrade, melt or burn.

Polyphosphonates are highly desirable as non-halogenated flame retardants that can be included as an additive to improve fire retardancy of thermoplastic and elastomeric compounds. However, compared to other types of non-halogenated flame retardants, polyphosphonates have a high affinity for capturing moisture, increasing the risk of hydrolysis and degradation when these compounds are exposed to heat and humidity. Degradation of polyphosphonates leads to lower molecular weight, and consequently a loss of mechanical properties, such as tensile strength, impact resistance and tensile modulus. In addition, the fire resistance of the polyphosphonate becomes diminished due to the lower molecular weight, which increases the melt flow properties, and thereby causes the material to be more likely to drip when exposed to a flame or heat.

Polyphosphonate compositions containing functional additives to improve stability when exposed to heat and moisture are disclosed in U.S. Pat. No. 7,666,932 (Freitag). However, these additives are limited to sterically hindered phenolic antioxidants, hydrolytically stable organophosphites, organophosphites, antioxidants, sterically hindered lactone antioxidants and combinations thereof. Moreover, U.S. Pat. No. 7,666,932 explicitly teaches that epoxy oligomers provide no improvement to the stability of polyphosphonate.

SUMMARY OF THE INVENTION

What the art needs is a functionalized polyphosphonate flame retardant having improved hydrolytic stability.

The present invention finds that, unexpectedly, epoxy-functional styrene-acrylic oligomer or aromatic carbodiimides can be used as functional additives to significantly improve the hydrolysis resistance of polyphosphonates, making such polyphosphonates more valuable as non-halogenated flame retardants.

One aspect of the present invention is a polyphosphonate flame retardant having polyphosphonate and either epoxy-functional styrene-acrylic oligomer or aromatic carbodiimide as a functional additive, and optionally antioxidant. The functionalized polyphosphonate flame retardant has improved hydrolytic stability represented by decreased conductivity of 10% or more compared to the polyphosphonate flame retardant without the functionalized additive as measured in units of μS/cm when immersed in distilled water and heated at 80° C. from six weeks to twenty weeks. In other words, reduced hydrolytic stability can be measured in this test by increased conductivity. Between the sixth and twentieth week of testing, the improved polyphosphonate flame retardants of the invention have lower conductivities per unit time than conventional polyphosphonate flame retardants. After twenty weeks of testing at the extreme conditions of immersion at 80° C. (176° F.) for almost five consecutive months, unfortunately, all polyphosphonates suffer from hydrolytic instability.

Another aspect of the invention is the functionalized polyphosphonate flame retardant described above, in a polymer compound. The polymer is preferably selected from a group consisting of polyester, polyurethanes, polyphenyl ethers, cellulose polymers, specialty polyester elastomers and combinations thereof. More preferably the polymer is polylactic acid (PLA), a biopolymer.

Another aspect of the invention is the polyphosphonate flame retardant described above, wherein about 0.1 weight percent to about 0.5 weight percent of the flame retardant is the functional additive in a thermoplastic compound.

Features of the invention will be explored below.

BRIEF DESCRIPTION OF THE DRAWINGS

FIG. 1 is a drawing showing the test results for the hydrolysis resistance of several different non-halogenated flame retardants at 80° C. immersed in distilled water for 36 weeks.

FIG. 2 is a drawing showing the test results for the hydrolysis resistance of the Examples and Comparative Example at 80° C. immersed in distilled water for 36 weeks.

EMBODIMENTS OF THE INVENTION

Polyphosphonate

Polyphosphonates used in this invention are polymer compounds containing repeating monomer units of $CH_3$—$PO(OH)_2$; $CH_3$—$PO(OH)$—$OR$, where R represents alkyl or aryl groups; or $R^1O$—$PO(R^3)$—$OR^2$, where $R^1$ and $R^2$ are aromatic or aliphatic and $R^3$ represents alkyl $C_1$-$C_6$ or aromatic. The polyphosphonates can be linear or branched. Preferred are polyphosphonate homopolymers having a polyphosphorous content of greater than about 8 weight percent, a glass transition temperature of at least about 100° C., and a limiting oxygen index of about 50% or higher. Polyphosphonates for this invention have a high molecular weight represented by about 10,000 g/mol or higher; and preferably about 20,000 g/mol or higher.

Commercially available polyphosphonates can be purchased from FRX Polymers under the FRX brand name, including the homopolymer FRX 100 polyphosphonate.

Functional Additives

Aromatic carbodiimides have been used as anti-hydrolysis agents for polyurethanes, polyethylenes, polybutylene terephthalate, thermoplastic polyester elastomers, polyamides and ethylene-vinyl acetate polymers; however, as presently known, they evidently have not been used for polyphosphonates. In this invention, aromatic carbodiimide reacts with the hydroxyl group on the polyphosphonate to form a urea group, as shown below. This reaction, shown in Equation I, has no negative impact on the performance of the polyphosphonate, but stabilizes the resulting modified polyphosphonate in the presence of water.

Equation I

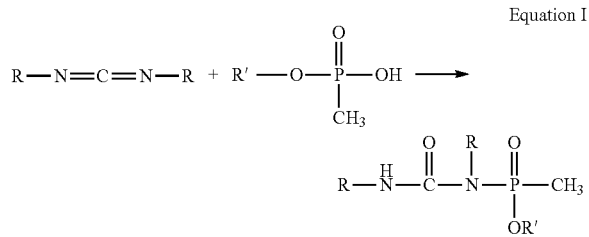

Stabaxol® is a commercially available aromatic carbodiimide product line manufactured by RheinChemie.

Epoxy-functional styrene-acrylic oligomers are typically used as functional additives for a variety of uses including improving chain extension, compatibilization, hydrolytic stabilization, and increased dispersion. Similarly to aromatic carbodiimide, epoxy-functional styrene-acrylic oligomers have not been used as an anti-hydrolysis agent for polyphosphonates. In the invention, shown in Equation II with explanation of the first reagent below the Equation II, the epoxy-functional styrene-acrylic oligomer reacts with the hydroxyl group on the polyphosphonate, which opens the epoxy ring and forms an ether linkage to the polyphosphonate, as shown below. The new ether linkage helps to prevent hydrolysis of the resulting modified polyphosphonate in the presence of water.

Equation II

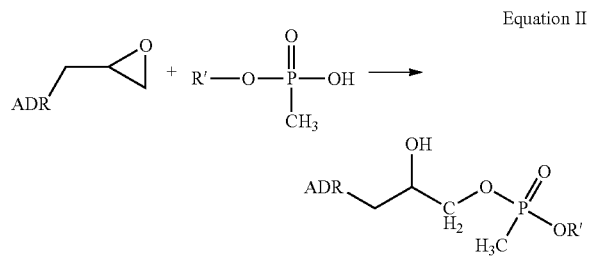

In Equation II,

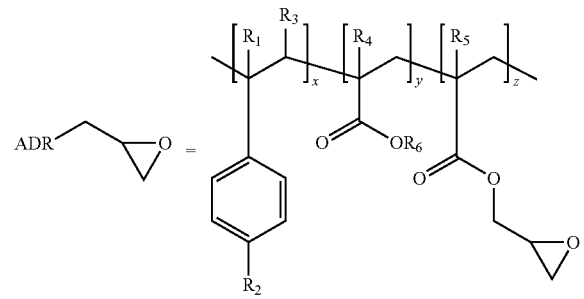

For the formula of ADR shown above, $R_1$ to $R_6$ each represent any of H, $CH_3$, or an aliphatic chain; and units x, y, z each represent a number ranging from 1-20. A commercially available example of epoxy-functional styrene-acrylic oligomer is the Joncryl® product line manufactured by BASF.

Antioxidants

Antioxidants are frequently used polymer additives that can be used to prevent oxidation of the polyphosphonate during the extrusion process. The formation of free radicals is inhibited by antioxidants, thereby enhancing the stability of polymers against light and heat. Preferable for use in this invention is a blend of a phenolic and phosphite antioxidants. Antioxidants are commercially available from a wide variety of manufacturers, including the IRGANOX® and IRGAFOS® brands sold by BASF, and the ETHANOX® and ETHAPHOS® brands sold by Albermarle Corporation.

Optional Other Additives

The compound of the present invention can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; catalyst deactivators, and combinations of them.

Table 1 shows acceptable, desirable, and preferable ranges of ingredients useful in the flame retardant of the present invention, all expressed in weight percent (wt. %) of the entire compound. The compound can comprise, consist essentially of, or consist of these ingredients.

TABLE 1

|  | Acceptable | Desirable | Preferable |
| --- | --- | --- | --- |
| Polyphosphonate homopolymer | 93-99.9 | 97-99.9 | 99.4-99.9 |
| Anti-hydrolysis agent | 0.1-0.5 | 0.1-0.25 | 0.1 |
| Antioxidant | 0-6.5 | 0-2.9 | 0.1-0.5 |

Processing

The preparation of the flame retardant and polymer compounds containing the flame retardant of the present invention is uncomplicated. The compound of the present can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

Usefulness Of The Invention

Literally, any plastic article useful in a human-occupied space such as a building, a vehicle, or a tunnel can benefit from this improved non-halogenated polyphosphonate flame retardant. Although brittle on its own, when blended with thermoplastic resins, the resulting flame retardant compound can readily be shaped by extrusion, molding, calendering, thermoforming, additive manufacturing, or other means of shaping into any plastic article.

Hydrolytically stable polyphosphonates are highly desirable for their ability to withstand high temperatures and humidity during melt mixing with thermoplastic resins, molding processes, and for their final use in flame retardant plastic articles. Moreover, polyphosphonate is a very effective non-halogenated flame retardant for certain polymers such as polyesters, polyurethanes, polyphenyl ethers, and cellulose polymers. In particular, polyphosphonates are uniquely suited for use with PLA. Therefore, the present invention allows compounds of such polymers to be useful in a wider variety of polymer applications that require flame retardancy, and especially for biopolymers, such as PLA.

EXAMPLES

Several commonly used non-halogenated flame retardants and PC 2658 polycarbonate as a control comparison were tested for their hydrolytic resistance, as shown in FIG. 1. Extruded pellets of each non-halogenated flame retardant was measured for conductivity using an ExStik® EC500 PH/Conductivity/TDS Meter at room temperature for a baseline conductivity value and then immersed in distilled water heated to 80° C. Afterwards each flame retardant was tested every two weeks, for 36 weeks. For testing of each flame retardant, the ratio of 5 grams flame retardant to 56.7 ml distilled water was maintained. 20,000 µs/cm is the detection limit of the ExStik® EC500 PH/Conductivity/TDS Meter.

Table 2 below provides a description of each non-halogenated flame retardant and the type of polymer recommended for use with each non-halogenated flame retardant. Although polyphosphonates, represented by FRX 100 polyphosphonate, show very poor resistance to hydrolysis in comparison to many other flame retardant compounds, polyphosphonate is the only flame retardant recommended for PLA and its blends, and it is also useful for polyesters, polyurethane, polyphenylene ether, polycarbonate and cellulose polymers.

TABLE 2

| Brand Name | Chemical description | Types of polymers recommended for |
|---|---|---|
| DOPO-HQ | 10-(2,5-dihydroxyphenyl)-9,10-dihydro-9-xa-10-phosphaphenanthrene-10-oxide | Epoxy, Polyester |
| Exolit 1312 | Formulated Aluminum Phosphinate plus N-synergist | Polyamide |

TABLE 2-continued

| Brand Name | Chemical description | Types of polymers recommended for |
|---|---|---|
| FP-800 | Organophosphate | Polycarbonate, Acrylonitrile Butadiene Styrene (ABS) |
| FP-2200 | Mixture of piperazine pyrophosphate, phosphoric acid, zinc oxide | Polyolefin |
| FRX-100 | Polyphosphonate | Polylactic Acid, Polycarbonate, Polyester, Polyurethane, Polyphenylene ether, and Cellulose Polymers |
| SPB-100 | Poly(bis(phenoxy) phosphazene) | Polycarbonate, Other Engineering Thermoplastics |

Examples 1-4 and Comparative Examples A

According to Freitag in U.S. Pat. No. 7,666,932, "since polyphosphonates with a desirable combination of properties where heretofor unknown materials, no additives have been specifically designed for use with these polymers. Therefore, it is not obvious, which, if any, of the available additives will provide protection to polyphosphonates from degradation due to exposure to high temperature (>250° C.) and air (oxygen), moisture or combination thereof." (Col. 3, Lines 32-39).

Freitag continues, "Many additives that are reported to provide stability to plastics were investigated" (Col. 5, Lines 7-8); however, of these additives, several, including epoxy oligomers, "none of which provided any improvement." (Col. 6, Lines 6-7). Notwithstanding this limited set of functional additives taught by Freitag, the present invention has found, unexpectedly, that an epoxy-functional styrene-acrylic oligomer or aromatic carbodiimide can react with polyphosphate to form a functionalized polyphosphate compound that is significantly more hydrolytically resistant.

Examples 1 and 2 tested epoxy-functional styrene-acrylic oligomer and Examples 3 and 4 tested aromatic carbodiimide compared to Example A, the control composition without either agent. The list of ingredients for the examples is shown in Table 3.

TABLE 3

| Ingredient Name | Purpose | Commercial Source |
|---|---|---|
| FRX-100 Polyphosphonate Homopolymer | Non-halogenated flame retardant additive | FRX Polymers |
| Joncryl 4368 epoxy-functional styrene-acrylic oligomer | Anti-hydrolysis agent | BASF |
| Stabaxol P 100 aromatic carbodiimide | Anti-hydrolysis agent | Rhein Chemie |
| Irganox B225 (Blend of Irgafos 168 and Irganox 1010) | Antioxidant | Ciba |

Table 4 shows the amount of each ingredient for Examples 1-4 and Comparative Example A and their mixing conditions in a Prism TSE 16 mm twin screw extruder (L/D=40/1). The FRX-100 was dried at 80° C. for 4 hours before melt-mixing. The extrudate was pelletized for later injection or compression molding.

TABLE 4

| | Example (Wt. %) | | | | |
|---|---|---|---|---|---|
| | 1 | 2 | 3 | 4 | A |
| FRX-100 Polyphosphonate (dried) | 99.8 | 99.4 | 99.8 | 99.4 | 99.9 |
| B225 stabilizer (blend of Irganox 1010 and IRGAFOS 168) | 0.1 | 0.1 | 0.1 | 0.1 | 0.1 |
| Joncryl 4368 epoxy-functional styrene-acrylate copolymer | 0.1 | 0.5 | — | — | — |
| Stabaxol P-100 aromatic carbodiimide | — | — | 0.1 | 0.5 | — |
| Total | 100% | 100% | 100% | 100% | 100% |
| Extruder Temperature (All Zones and Die) (° C.) | 230 | 230 | 230 | 230 | 230 |
| RPM | 300 | 300 | 300 | 300 | 300 |
| % Torque | 45-50 | 50-60 | 52-60 | 45-47 | 50-60 |
| Die Pressure (Bar) | 3 | 4 | 5 | 6 | 3 |
| Feeder Rate % | 25 | 25 | 24 | 25 | 25 |
| Comment | Brittle | Brittle | Brittle | Brittle | Brittle |

For the hydrolysis resistance testing, extruded pellets of each Comparative Example and Example were measured for conductivity using an ExStik® EC500 PH/Conductivity/TDS Meter at room temperature for a baseline conductivity value and then immersed in distilled water heated to 80° C. The ratio of 5 grams to 56.7 ml distilled water was maintained for hydrolysis resistance testing of the Comparative Example and Examples. After every two weeks of continuous immersion, each Example and Comparative Example was then re-tested for conductivity using the same meter.

Table 5 shows the results of this hydrolysis resistance testing. Increased conductivity represents the generation of charge carrying species, indicating hydrolysis had occurred concomitantly.

TABLE 5

| | Example | | | | |
|---|---|---|---|---|---|
| Hydrolysis Resistance Testing (micro Siemens/cm) | 1 | 2 | 3 | 4 | A |
| Week 0 | 3.7 | 3.4 | 3.2 | 3.4 | 4.3 |
| Improvement Over Comparative Example A | 14% | 21% | 26% | 21% | |
| Week 2 | 235 | 287 | 229 | 141 | 224 |
| Improvement Over Comparative Example A | −5% | −28% | −2% | 37% | |
| Week 4 | 390 | 483 | 275 | 203 | 368 |
| Improvement Over Comparative Example A | −6% | −31% | 25% | 45% | |
| Week 6 | 570 | 700 | 395 | 390 | 790 |
| Improvement Over Comparative Example A | 28% | 11% | 50% | 51% | |
| Week 8 | 857 | 1003 | 807 | 916 | 2480 |
| Improvement Over Comparative Example A | 65% | 60% | 67% | 63% | |
| Week 10 | 1332 | 1811 | 1637 | 1648 | 4360 |
| Improvement Over Comparative Example A | 69% | 58% | 62% | 62% | |
| Week 12 | 2160 | 2620 | 3200 | 2350 | 5360 |
| Improvement Over Comparative Example A | 60% | 51% | 40% | 56% | |
| Week 14 | 3150 | 4230 | 4200 | 4470 | 6890 |
| Improvement Over Comparative Example A | 54% | 39% | 39% | 35% | |
| Week 16 | 4700 | 5710 | 4760 | 6060 | 7060 |
| Improvement Over Comparative Example A | 33% | 19% | 33% | 14% | |
| Week 18 | 5520 | 5930 | 5320 | 6570 | 7550 |
| Improvement Over Comparative Example A | 27% | 21% | 30% | 13% | |
| Week 20 | 5810 | 6260 | 5200 | 6820 | 7650 |
| Improvement Over Comparative Example A | 24% | 18% | 32% | 11% | |
| Week 22* | — | — | — | — | — |
| Improvement Over Comparative Example A | — | — | — | — | |
| Week 24 | 6580 | 7110 | 5810 | 7210 | 7960 |
| Improvement Over Comparative Example A | 17% | 11% | 27% | 9% | |
| Week 26 | 6870 | 7290 | 6940 | 7370 | 8180 |
| Improvement Over Comparative Example A | 16% | 11% | 15% | 10% | |
| Week 28 | 7280 | 7520 | 7510 | 7680 | 8480 |
| Improvement Over Comparative Example A | 14% | 11% | 11% | 9% | |
| Week 30 | 7770 | 7840 | 7610 | 8300 | 8770 |
| Improvement Over Comparative Example A | 11% | 11% | 13% | 5% | |
| Week 32 | 8030 | 8040 | 7980 | 8500 | 8780 |
| Improvement Over Comparative Example A | 9% | 8% | 9% | 3% | |
| Week 34 | 8140 | 8130 | 7980 | 8570 | 8810 |
| Improvement Over Comparative Example A | 8% | 8% | 9% | 3% | |
| Week 36 | 7720 | 7830 | 7660 | 8140 | 8540 |
| Improvement Over Comparative Example A | 10% | 8% | 10% | 5% | |

*The samples were not tested for Week 22.

The results in the table above are also visually represented in FIG. 2.

The test conditions are very, very severe upon the polyphosphonate samples. Whereas high temperature and humidity in even the most tropical locations in the world might be 43° C. and 100% humidity, those conditions are a minor fraction of the test conditions endured by the Examples and Comparative Example.

Between six weeks and twenty weeks all Examples were superior in hydrolytic resistance, showing decreased conductivity of 10% or more compared to Comparative Example A. Moreover, Examples 1 and 3, which contained 0.1% epoxy-functional styrene-acrylic oligomer and 0.1% aromatic carbodiimide respectively, performed better than Examples 2 and 4, which contained 0.5% epoxy-functional styrene-acrylic oligomer and 0.5% aromatic carbodiimide respectively. Thus, surprisingly, a smaller amount of functional additive, from less than 0.5% ranging to about 0.1%, the higher the hydrolytic resistance of the polyphosphonate flame retardant and the lower the cost required for additional amounts of additive. It is therefore contemplated that the amount of functional additive can be 0.4% or less, desirably 0.3% or less, or preferably 0.2% or less.

Due to extreme conditions of complete and continuous immersion in water with heating to 80° C. (176° F.), hydrolysis of the Examples and Comparative Example was fiercely, rapidly accelerated. Consequently after twenty weeks, even the Examples of the invention became vulnerable to hydrolysis. The comparison of molecular weights in Table 6 according to high performance size extrusion chromatography reveals that the molecular weights of Comparative Example A and Examples 1-4 were reduced by more than 95% after thirty-six weeks. Such a low molecular weight indicates the polymer chains of the polyphosphonate had likely broken down into smaller oligomers or the individual monomers, causing loss of hydrolytic stability under conditions unlikely to be seen in commercial use after taking into consideration the acceleration of the aging study.

TABLE 6

| | Mn (Initial) | Mn* | Percent Change | Mw (Initial) | Mw* | Percent Change |
|---|---|---|---|---|---|---|
| Example 1 | 12230 | 976 | 92.02% | 48775 | 1554 | 96.81% |
| Example 2 | 12630 | 966 | 92.35% | 52320 | 1526 | 97.08% |
| Example 3 | 13740 | 975 | 92.90% | 48075 | 1541 | 96.79% |
| Example 4 | 12445 | 940 | 92.45% | 52165 | 1483 | 97.16% |
| Comparative Example A | 10665 | 933 | 91.25% | 38725 | 1462 | 96.22% |

*After 36 weeks of hydrolysis testing

The invention is not limited to the above embodiments. The claims follow.

What is claimed is:

1. A flame retardant consisting of:
   (a) polyphosphonate homopolymer in an amount of about 99.8 weight percent, by weight of the flame retardant;
   (b) functional additive in an amount of about 0.1 weight percent, by weight of the flame retardant; and
   (c) antioxidant in an amount of about 0.1 weight, by weight of the flame retardant;
   wherein the polyphosphonate homopolymer has a molecular weight of about 10,000 g/mol or higher, a phosphorous content of greater than about 8 weight percent, a glass transition temperature of at least about 100° C., and a limiting oxygen index of about 50% or higher;
   wherein the functional additive is selected from the group consisting of epoxy-functional styrene-acrylic oligomer, aromatic carbodiimide, and combinations thereof; and
   wherein the flame retardant has improved hydrolytic stability, represented by decreased conductivity of 10% or more compared to the flame retardant without the functional additive as measured in units of µS/cm when immersed in distilled water and heated at 80° C. for at least 6 weeks and up to 20 weeks.

2. The flame retardant of claim 1, wherein the antioxidant is selected from a group consisting of phenolic antioxidants, phosphite antioxidants, and combinations thereof.

3. The flame retardant of claim 1, wherein the functional additive is epoxy-functional styrene-acrylic oligomer.

4. A flame retardant consisting of:
   (a) polyphosphonate homopolymer in an amount of about 99.8 weight percent, by weight of the flame retardant;
   (b) epoxy-functional styrene-acrylic oligomer in an amount of about 0.1 weight percent, by weight of the flame retardant; and
   (c) antioxidant in an amount of about 0.1 weight, by weight of the flame retardant;
   wherein the polyphosphonate homopolymer has a molecular weight of about 10,000 g/mol or higher, a phosphorous content of greater than about 8 weight percent, a glass transition temperature of at least about 100° C., and a limiting oxygen index of about 50% or higher;
   wherein the antioxidant is selected from the group consisting of phenolic antioxidants, phosphite antioxidants, and combinations thereof; and
   wherein the flame retardant has improved hydrolytic stability, represented by decreased conductivity of 10% or more compared to the flame retardant without the functional additive as measured in units of µS/cm when immersed in distilled water and heated at 80° C. for at least 6 weeks and up to 20 weeks.

5. A flame retardant consisting of:
   (a) polyphosphonate homopolymer in an amount of about 99.8 weight percent, by weight of the flame retardant;
   (b) aromatic carbodiimide in an amount of about 0.1 weight percent, by weight of the flame retardant; and
   (c) antioxidant in an amount of about 0.1 weight, by weight of the flame retardant;
   wherein the polyphosphonate homopolymer has a molecular weight of about 10,000 g/mol or higher, a phosphorous content of greater than about 8 weight percent, a glass transition temperature of at least about 100° C., and a limiting oxygen index of about 50% or higher;
   wherein the antioxidant is selected from the group consisting of phenolic antioxidants, phosphite antioxidants, and combinations thereof; and
   wherein the flame retardant has improved hydrolytic stability, represented by decreased conductivity of 10% or more compared to the flame retardant without the functional additive as measured in units of µS/cm when immersed in distilled water and heated at 80° C. for at least 6 weeks and up to 20 weeks.

* * * * *